United States Patent Office 3,023,622
Patented Mar. 6, 1962

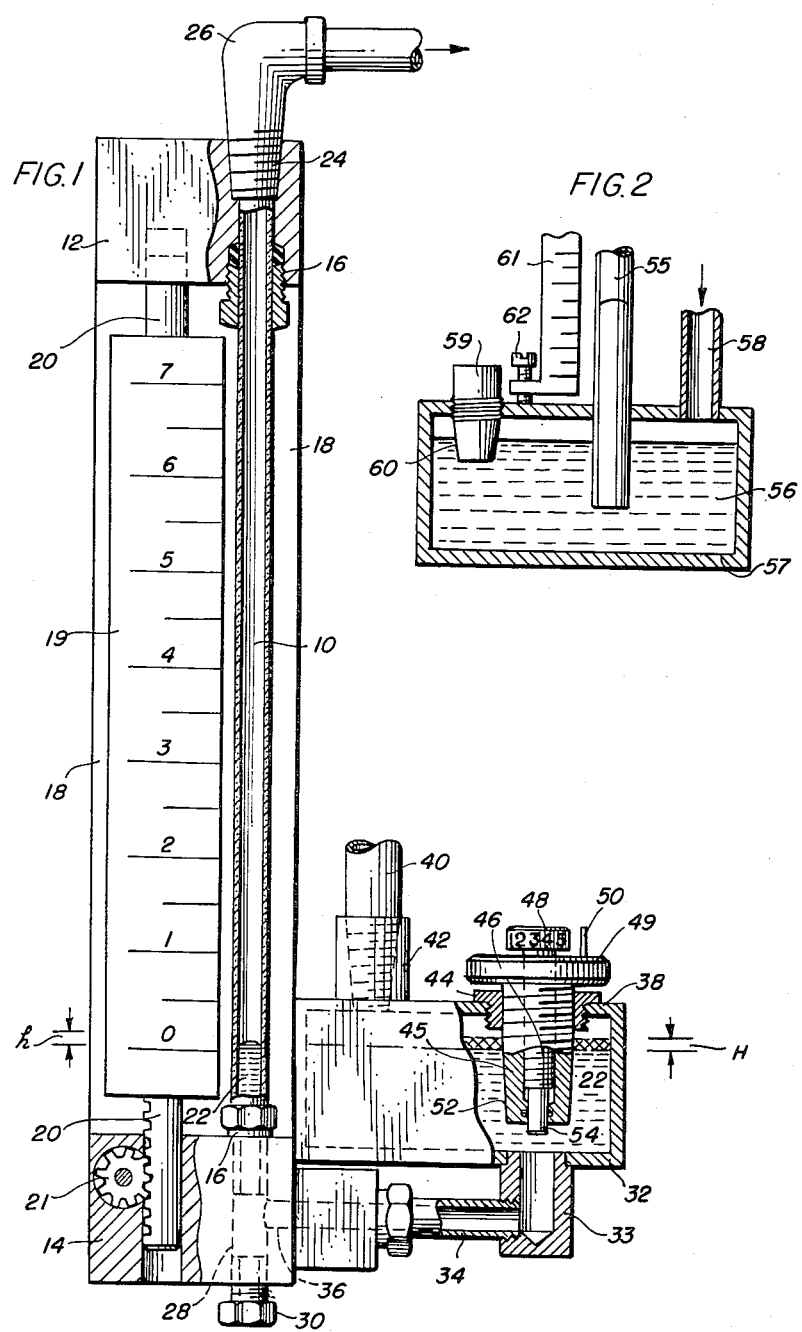

3,023,622
MANOMETERS
Roger J. Hezarifend, Skokie, Ill., assignor, by mesne assignments, to General Controls Co., Glendale, Calif., a corporation of California
Filed Nov. 3, 1958, Ser. No. 771,607
2 Claims. (Cl. 73—401)

This invention relates to a manometer and is more particularly described as a cistern or well type of instrument in which the bottom of a tube may be inserted directly into a well at the bottom or connected to a well separated or remote from the tube.

In the past, it has been common practice to foreshorten manometer scales to compensate for the well drop and then to expand the scale to correct the instrument for establishing a standard condition. A gravity correction base was also incorporated into the scale of such an instrument. This means that there is no satisfactory method of accurately determining such a scale since no standard unit of length can be used to measure it.

The invention proposes a new method of correcting inherent errors in the cistern type of manometers by correcting the cistern internal diameter so that the instrument itself is automatically made to read either for standard conditions, namely, 0° C. for mercury, or 20° C. for water at standard barometric conditions, or any other standard reference which may be desired. In accomplishing this result, the cistern should be over-sized so that a plug or series of plugs of known sizes may be incorporated into the instrument whereby it may be corrected for any location.

An important object of the invention is to make the well or cistern sufficiently over-sized so that the well drop correction is equal to the total corrections for temperature, gravity, well area and tube area so that the instrument is made to read in linear lengths in a system using any fluid of a known specific gravity or if necessary, where the specific gravity of the fluid is unknown, it could be measured or determined.

A further object of the invention is to provide a manometer having an over-sized well or cistern together with a plug or series of plugs which when used to correct the instrument for a given locality will remain constant for that place so that no further plug variations are necessary and a linear scale of any standard unit of length can be used which can always be checked for accuracy under the same working conditions.

Other objects of the invention will appear in the specification and will be apparent from the accompanying drawings in which, FIG. 1 is a sectional elevation of a manometer in accordance with this invention with a well connected at the bottom of a tube but separated or spaced therefrom; and FIG. 2 is a somewhat diagrammatic figure representing a tube in which the bottom extends directly into the well with an adjusting plug also projecting into the top of the well.

Manometers of the cistern type as herein proposed have a linear scale which reads either in a metrical scale or in any other standard unit of length. This instrument will compensate for the following corrections in the instrument itself; temperature, gravity, well drop, compressibility, well area to tube area. The corrections are accomplished by making the well drop correction equal to the total corrections for all of these variables. To be commercially practical, each well or cistern is designed to meet the specific local acceleration of gravity and the ambient temperatures at which it is proposed to use the instrument.

Referring now more particularly to the drawings, a manometer tube 10 usually of glass or other suitable transparent material connected at its ends in upper and lower blocks 12 and 14 by means of suitable packing glands 16 for securing it tightly in place and the blocks are usually connected by a casing 18 with a graduated scale 19 attached to a rack bar 20 adjustable therein close to the tube by a pinion 21 so that the height of mercury 22 (or other liquid) may be closely observed and determined.

At the top of the casing is an opening 24 communicating with the top of the tube 10 and an elbow or other fitting 26 is commonly applied to the opening to protect it from particles falling therein. In the bottom block 14 is an opening 28 for access to the tube commonly fitted and sealed by a threaded plug 30.

At one side of the casing and somewhat remote therefrom if desired, is a cistern or well 32 connected through a fitting 33 in its bottom by a tube 34 which extends into the lower block 14, having a passage 36 connecting it to the lower end of the tube 10.

The well 32 has a top 38 suitably secured thereto and sealing the well. A pressure receiving pipe 40 is connected through the top 38 by a suitable threaded boss 42 to insure a tight connection and the height of the well is so adjusted with respect to the zero point of the tube that the mercury level is about the center when there is no pressure applied through the pipe 40.

Also inserted through the top 38 of the well is a mounting collar 44 for a plug 45 threaded at the outside to make a tight fitting with the collar and threaded on the inside to receive and adjust a vernier screw 46 which projects through the inner end of the plug to contact the mercury or other liquid in the well. This screw has a handle or top 48 preferably circular with a graduated periphery somewhat larger in diameter than the screw 46 to provide an accurate variation and adjustment with respect to a reference point or a pin 50 which projects from the top 38 or from a head 49 of the plug 4 adjacent the edge of the rotatably adjustable top 48.

The lower or inner mercury contacting end of the plug 45 is preferably formed on the outside with a tapered or beveled surface 52, thinner at the end to vary the ratio of the corrections when other functions are to be considered, and by likewise displacing the end of the screw 46 which has a contact extremity 54 to vary the level of the liquid depending upon the amount that the screw 46 is inserted. This extremity may be made larger or smaller for different variations of the vernier screw and to accommodate different capillary corrections.

In the form shown in FIG. 2, a manometer tube 55 extends directly into liquid 56 in a well 57 which has a pressure inlet 58 and an adjustable plug 59 fitting into the well and having a tapered end 60 contacting the liquid. Adjacent the tube 55 is a scale 61 having an adjusting screw 62 for accurately positioning the scale relative to the pressure meniscus in the tube 55.

Obviously a number of corrections are applied to the instrument when the pressure indicated by the tube is read in terms of the variation of the height of the liquid in the tube, but in the majority of applications, the density of the liquid and gravity are constant, but not standard due to temperature, for instance, or geographic location.

Design corrections are also applied since the displacement of the indicating fluid in the tube amplitude $h$ creates a void in the well of an amplitude $H$. Compressibility of the molecules of the indicating fluid and the sealing column on top of the fluid are creating also an amount of error in the reading of the pressure in terms $h$ when under high pressure.

Finally, mechanical discrepancies in the instrument also need a correction. This instrument therefor compensates for temperature, gravity, well drop, compressibility and the ratio of well area to tube area by making the well drop corrections equal to or greater than all of the corrections necessary for the above mentioned variables. Compressibility will vary as the pressure changes and if the density and the acceleration of gravity are not standard, the amount of error for the drop in the well increases and is a function of the ratio of the inside diameter of the well to the inside of the tube diameter.

This instrument substitutes a linear scale which can be of any standard unit of length so that it can be changed for accuracy under the same working conditions. For this method, the ratio of the inside well diameter $L$ and the tube inside diameter $L_1$ varies, as:

$$\frac{L_1}{L} = \sqrt{\frac{H}{h}}$$

In the locality of Chicago, this ratio is 14.8735.
When $h=1$, this becomes $$\frac{L_1}{L} = \sqrt{H}$$

When $C_1$ = the correction for temperature, and
$C_2$ = the correction for acceleration of gravity, since $H$ is the sum of the variation errors $C_1 + C_2$, it is evident that the scale can be graduated in standard units; and when $C_1 + C_2$ are made equal to the corrections in the scale for drop in the well or $H$;

$$\frac{L_1}{L} = \sqrt{C_1 + C_2}$$

When $L_1$ is known, the ideal area, $A_1$ for the well can be easily compiled:

$$A_1 = \frac{L_1^2 \times \pi}{4(C_1 + C_2)}$$

As a matter of practice or convenience, the well is deliberately made oversized to take care of standard conditions (45° at sea level), the area of the production well $A$ is then corrected by inserting a plug to provide correction for local acceleration of gravity and temperature.

The diameter of the plug or plugs to compensate for the difference in area $a$ of the oversized cistern or well where $a$ is the oversized area, will be:

$$d = \sqrt{\frac{4A_1 - A}{\pi}}$$

Compressibility and sealing column error is compensated by tapering the plug 45 as shown.

Capillarity is also corrected by the plug by providing the vernier in connection with the top 48 and the displacer extremity 54 at the end of the screw 46 to correct for capillarity at any given point of the column in the tube 10.

An instrument of this kind is particularly desirable and useful in carrying out various research and development projects; it provides means for accurate pressure measurement for jet engine testing and wind tunnel work; it provides means for measuring supersonic flow in sub- trans- and typersonic conditions; it provides more accurate measurement of gas and steam flow meters and it provides additional means for accurately calibrating other instruments.

A manometer of this kind is therefore particularly valuable wherever close and accurate measurements of pressure and variation are encountered and the instrument is particularly useful and valuable since it can be calibrated at the standard temperature and gravity conditions using a linear scale with a standard unit of measure.

While a preferred embodiment of the invention has been described in some detail, it should be regarded as an illustration or example rather than as a limitation or restriction of the invention, since various changes in the construction, combination, and arrangement of the parts may be made without departing from the spirit and scope of the invention.

I claim:

1. A manometer comprising a straight tube of uniform internal diameter, a well to which the bottom of the tube is connected, a liquid in the well and extending into the bottom of the tube, means in the top of the well for applying pressure to the well and liquid therein, a standard scale for indicating in the tube the pressure applied to the well, and the diameter of the tube having a definite and determined ratio of area to that of the well for any particular location as indicated in accordance with the graduations of the standard scale, the well having an area which is relatively oversized for said ratio of area of the particular location, and additional means in connection with the well extending therethrough into the liquid to vary the effective area relative to that of the tube for accommodation to any location in which it may be applied, said additional means to vary said effective area comprising a screw plug having a contact end to engage and project into the liquid and a rotating head attached to the screw and with peripheral graduations movable relative to a fixed projection constituting a vernier adjustment for capillary correction of liquid in the indicating tube.

2. A manometer comprising a straight tube of uniform internal diameter, a well to which the bottom of the tube is connected, a liquid in the well and extending into the bottom of the tube, means in the top of the well for applying pressure to the well and liquid therein, a standard scale for indicating in the tube the pressure applied to the well, and the diameter of the tube having a definite and determined ratio of area to that of the well for any particular location as indicated in accordance with the graduations of the standard scale, the well having an area which is relatively oversized for said ratio of area of the particular location, and additional means in connection with the well extending therethrough into the liquid to vary the effective area relative to that of the tube for accommodation to any location in which it may be applied, said additional means comprising a hollow plug insertable through the well into the liquid of the well having an outside thread for varying the projection of the end into the liquid, the inner end of said plug being tapered and the inner periphery of the plug being threaded, a screw stem threaded into the plug and projecting through the plug with an inner end to engage the liquid, means to rotate the screw from the outside of the well, said means having a peripheral graduation and a fixed projection on the well relative to which it is moved to accurately determine the extent of movement.

References Cited in the file of this patent
UNITED STATES PATENTS

| | | |
|---|---|---|
| 2,423,394 | Lee | July 1, 1947 |
| 2,570,943 | Hass | Oct. 9, 1951 |